United States Patent [19]

Yamamoto

[11] 4,078,763
[45] Mar. 14, 1978

[54] OIL EXTRACTOR FOR VEHICLE ENGINES AND THE LIKE

[76] Inventor: Naoyuki Yamamoto, 812-1 Atsuhara, Fuji, Shizuoka, Japan

[21] Appl. No.: 711,601

[22] Filed: Aug. 4, 1976

[51] Int. Cl. ............................................. F16k 35/00
[52] U.S. Cl. ..................................... 251/96; 137/315; 251/214; 251/286; 251/288; 251/315
[58] Field of Search ..................... 251/96, 98, 99, 101, 251/102, 107, 111, 114, 214, 286, 288, 304, 312, 315; 137/315

[56] References Cited

U.S. PATENT DOCUMENTS

| 1,973,418 | 9/1934 | Sibley | 137/315 |
| 2,035,762 | 3/1936 | Roberts | 251/96 |
| 2,118,232 | 5/1938 | Roberts | 251/288 |
| 2,194,714 | 3/1940 | Mueller | 251/96 |
| 2,665,879 | 1/1954 | Housekeeper et al. | 251/315 |
| 3,112,758 | 12/1963 | Norton | 137/315 |
| 3,764,102 | 10/1973 | Shopsky | 251/96 |

FOREIGN PATENT DOCUMENTS

| 163,683 | 8/1933 | Switzerland | 251/110 |
| 1,222,210 | 2/1971 | United Kingdom | 251/96 |
| 473,048 | 10/1937 | United Kingdom | 251/99 |
| 521,848 | 6/1940 | United Kingdom | 251/96 |
| 526,708 | 9/1940 | United Kingdom | 251/96 |

Primary Examiner—Martin P. Schwadron
Assistant Examiner—G. L. Walton
Attorney, Agent, or Firm—Martin A. Farber

[57] ABSTRACT

This invention relates to a shut-off valve type oil extractor that can be screwed into an oil pan in a vehicle engine or the like, and more particularly it relates to an oil extractor of the said type which is characterized particularly in that it is locked in a shut-off state so that it won't be inadvertently opened by mechanical vibration caused during running of the vehicle.

1 Claim, 3 Drawing Figures

OIL EXTRACTOR FOR VEHICLE ENGINES AND THE LIKE

FIELD OF THE INVENTION

This invention relates to an accessory part of an engine for vehicles such as passenger cars, lorries, etc., and more particularly it relates to an oil extractor which can be screwed into the drain port of the oil pan in the engine.

BACKGROUND OF THE INVENTION

Generally, for keeping proper function of an engine for vehicles, there is a need to change the lubricating oil periodically or non-periodically. For this purpose, usually a drain port is provided in the oil pan of the engine and such drain port is closed by a plug. However, according to such type of drain plug, if the plug is inadvertently removed when changing the lubricating oil, the lubricating oil in the oil pan may spill or scatter away to soil the worker's clothes or the floor of the workshop. Also, repeated use (fitting and removal) of such drain plug may result in a loose fit, and careless fixing of such plug may cause imperfect sealing to give rise to dangerous leaking of the lubricating oil.

For overcoming such problem, it has been attempted to adapt a shut-off valve at the drain port, but such attempt has practically ended in failure because mere incorporation of such a shut-off valve could not eliminate the risk of a chance opening of the valve by vibration of the vehicle.

Therefore, a change of the lubricating oil is usually practiced by inserting into the oil pan an end of an oil hose connected to a manually operatable oil pump. It is however difficult for the ordinary household to be equipped with such an oil pump, so that the oil change is usually practiced as a commercial deal at a filling station or a repair shop. This, however, involves some serious problems such as fairly high cost of oil change at such places and impracticality for a resident at a back-country to go all the way to a repair shop for the only purpose of an oil change.

SUMMARY OF THE INVENTION

The primary object of this invention is to provide an oil extractor of a shut-off valve type that can be screwed into the drain port of the oil pan.

Another object of this invention is to provide an oil extractor of such a type which can be securely locked in the closed position so that it cannot be inadvertently opened by mechanical vibration of the vehicle and which, when so desired for an oil change or for other purposes, can be opened manually with no need to use any specific tool therefore.

Still another object of this invention is to provide an oil extractor of the described type which can be supplied at a cost almost equal to or even lower than the charge for labor (for oil change) at the repair shop or such.

According to the present invention, these objects can be accomplished by an oil extractor for vehicle engines or the like comprising a base block whose inlet portion can be screwed into the oil pan of the vehicle engine and which is formed with an L-shaped opening in the peripheral surface of the bushing portion, a spindle rotatably positioned in said bushing portion with an end of the spindle being engaged with the valve body housed in the base block, a compression spring disposed in the bushing portion, and a manually operated handle having its inner end portion slidably engaged with the square stem portion of the spindle and placed under the action of the compression spring and also having its outer end portion passing through the opening to extend outside of the bushing portion, wherein the manually operated handle is usually locked in the inoperative position formed at a part of the opening by the compression spring. According to such an oil extractor, it is possible to extract the used lubricating oil and replace it with fresh oil by merely setting the manual handle to the open position. This allows even the ordinary vehicle operator to perform an oil change alone with ease.

Also, according to the oil extractor of this invention, since the valve body is usually locked in the closed position, there is no likelihood of inadvertent opening of the extractor due to vibration of the vehicle or impact applied to the vehicle body.

DETAILED DESCRIPTION OF THE PREFERRED EMBODIMENTS

Figure 1:
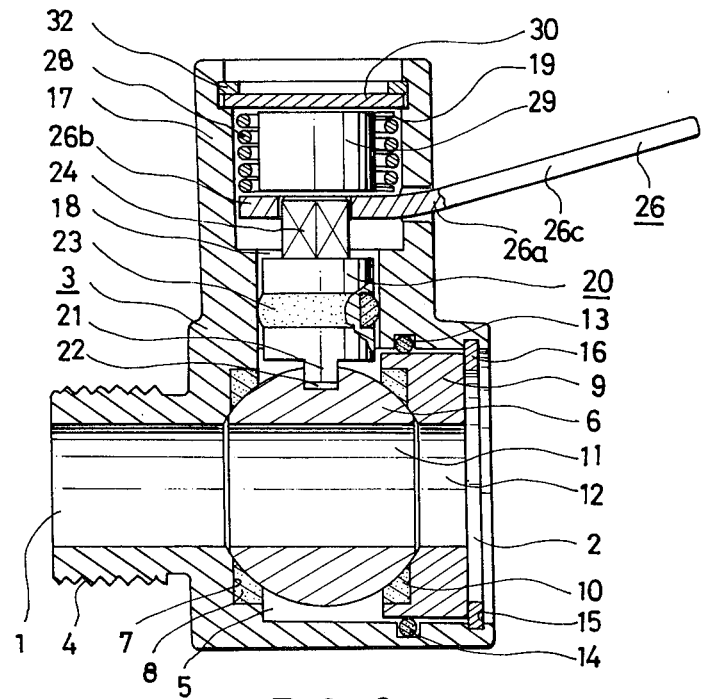
FIG. 1 is a sectional view of an oil extractor for vehicle engines or the like according to the present invention, the extractor being here shown in its open position.

Referring first to FIG. 1, there is shown in section a preferred embodiment of an oil extractor for vehicle engines according to the present invention. This oil extractor comprises a base block 3 formed with an inlet port 1 and an outlet port 2. The base block 3 is cast from a metal such as brass, and its plug portion has an external thread 4 for threaded engagement with the oil pan P of a vehicle engine. Formed in the base block 3 is a cylindrical valve chamber 5 in which is positioned a valve body 6, embodied herein as a spherical valve, which is secured liquid-tightly by an annular seal 8 positioned on the seat surface 7 of the base block 3 and another a annular seal 10 supported by a retainer 9 as further described later. The valve body 6, formed with a passage 11 connected to the inlet port 1 and outlet port 2 is, inserted into the base block 3 from the outlet port 2 of a large diameter and is secured in position by the thick circular retainer 9. The retainer 9 has formed centrally therein a hole 12 that can be communicated with the passage 11, and the space between the peripheral surface of the retainer and the outlet port 2 is sealed by an O-ring 14 fitted in an annular groove 13. The retainer 9 is also withheld against removal from the base block 3 by a C-shaped stopper ring 16 which can be elastically fitted in an annular groove 15 formed in the inner peripheral surface of the base block 3.

Said base block 3 has at its upper part a cylindrical bushing portion 17 which has formed therein a circular-sectioned stepped shaft hole 18 in communication with the valve chamber 5 and a spring housing 19. Positioned in the shaft hole 18 is a columnar spindle 20 which has at its lower end a protuberance 21 engaged in a slot 22 formed in the upper surface of the valve body 6. Thus, when the spindle 20 and the valve body 6 are assembled in position, the valve body 6 can be rotated integrally with the spindle 20.

Figure 3:
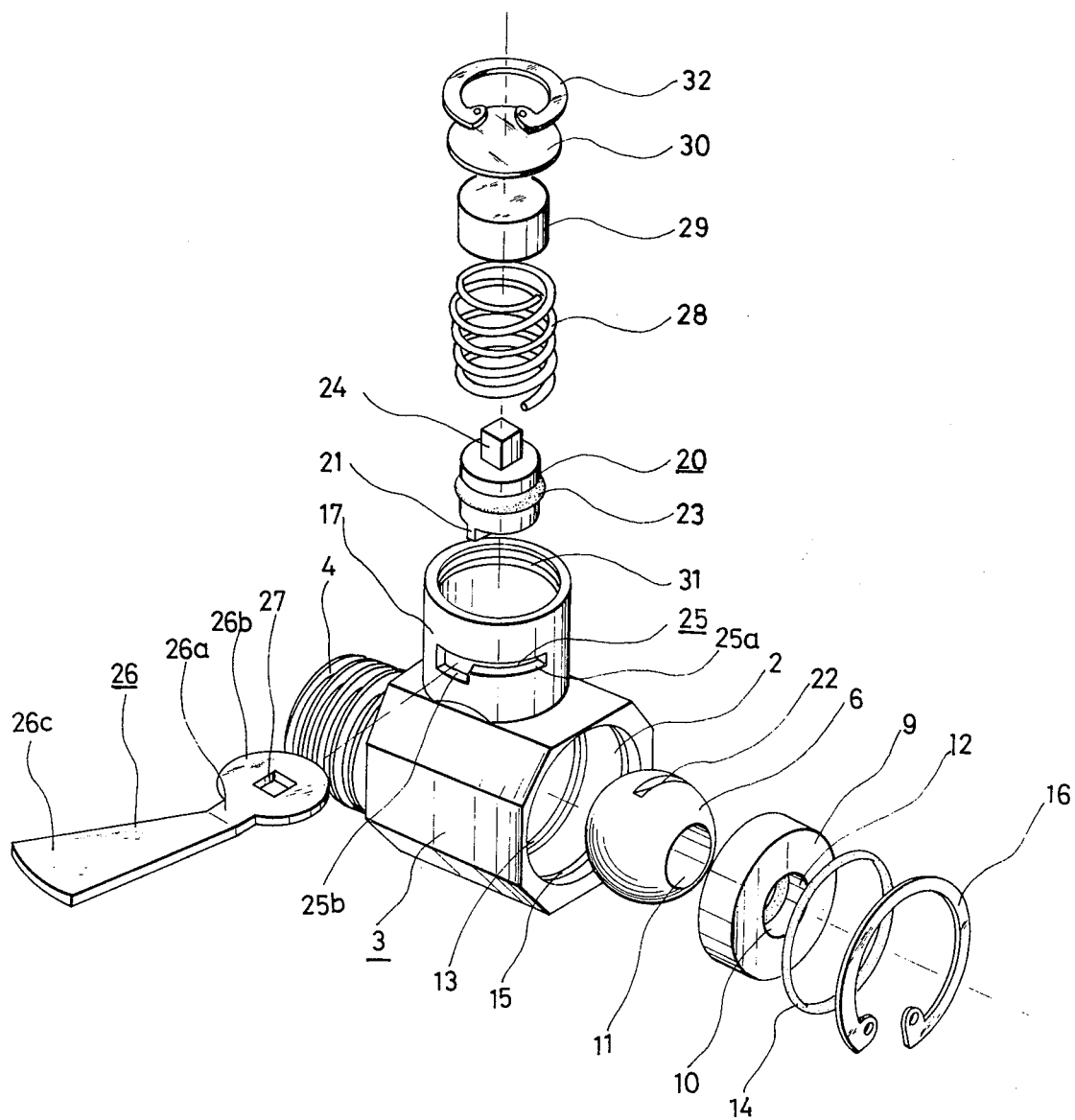
FIG. 3 is an exploded perspective view of the same oil extractor.

The space formed between the shaft hole 18 and the peripheral surface of the spindle 20 is sealed by a seal ring 23 positioned in an annular groove provided in the peripheral surface of the spindle 20. The spindle 20 has a square stem portion 24 which extends into spring housing 19, and as best shown in FIG. 3, an L-shaped opening 25 is formed in that part of the peripheral surface of the bushing 17 which corresponds adjacent to the square stem portion 24. The opening 25 composes a guide portion 25a having the circular measure of approximately 120° and a locking portion 25b formed at an end of the guide portion 25a extending downwardly axially relative to the portion 25a. Passing through the opening 25 is a neck portion 26a of a manually operated handle 26 which has its proximal end portion axially slidably engaged with the square stem portion 24. The manual handle 26 includes a disc-shaped proximal end portion 26b having a square hole 27 centrally formed therein with a configuration corresponding to the sectional shape of the square stem portion 24, a substantially flat neck portion 26a positioned in the opening 25, and a grip portion 26c extending outside of the bushing portion 17 and inclined relative to disc end portion 26b.

Positioned in the spring housing 19 is a compression spring 28 having one end pressed against the surface of the proximal end portion 26b of the manual handle 26. Also positioned in the space encompassed by the compression spring 28 is a columnar insert 29 adapted to prevent removal of the spindle 20 and the manual handle 26 and spaced to constantly maintain the projection 21 in engagement in the slot 22 of the valve body 6. The insert 29 is prevented against removal from the bushing portion 17 by a disc 30 adapted to receive the other end of the compression spring 28. The disc 30 is secured to the bushing portion 17 by a C-shaped stop ring 32 elastically engaged in an annular groove 31 on the inner peripheral surface of the bushing portion 17.

The oil extractor for vehicle engines according to the present invention has the above-described structural setup, so that assembling of this oil extractor can be accomplished in the following way. First, the O-ring 14 is set in the annular groove 13 in the base block 3, then the valve body 6 and retainer 9 are slided down into the base block 3 from the outlet port 2, and then the stopper ring 16 is fitted in the annular groove 15. Thereafter, by adjusting the protuberance 21 with the slot 22 in the valve body 6, the spindle 20 is positioned in the shaft hole 18 from the spring housing 19 while the proximal end portion 26a of the manual handle 16 is positioned in the bushing portion 17 by passing it through the opening 25 in the base block 3, with the square stem portion 24 of said spindle 20 being fitted in the corresponding square hole 27. Then, the compression spring 28 and insert 29 are positioned in the spring housing 19 in the bushing portion 17, and after pressingly engaging the outer ends of the compression spring 28 and insert 29 against the disc 30, the stop ring 32 is secured in the annular groove 31, this completing the assembling of an oil extractor of this invention.

Figure 2:
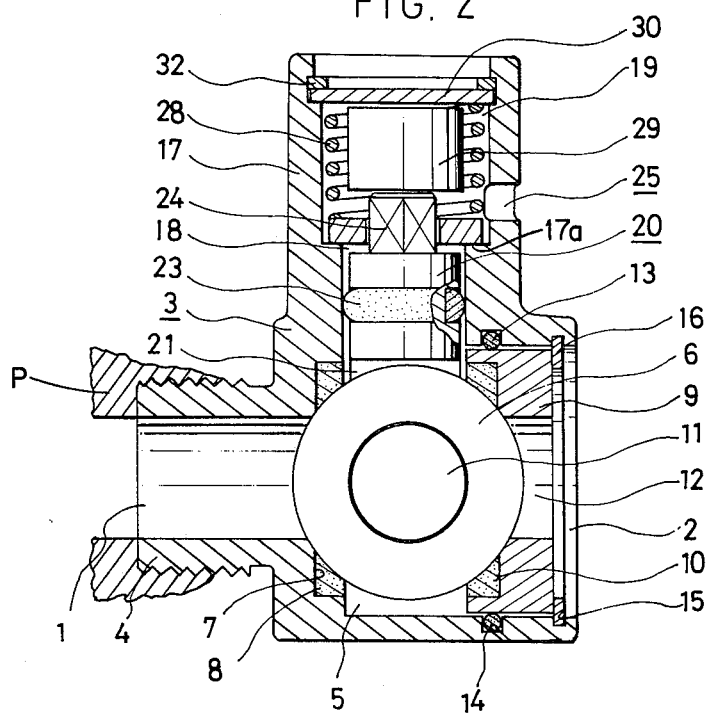
FIG. 2 is a similar view of the oil extractor as it is shown in its closed position.

In the oil extractor of this invention, the manual handle 26 is pushed in a given downward direction by the compression spring 28, so that the disc end portion 26b is pressed downwardly stabilizing against widened annular shoulder 17a in the shaft bore 18 and the neck portion 26a of the handle 26 is normally positioned in the locking portion 25b of the opening 25. Therefore, even if mechanical vibration or impact is applied to the oil extractor, the valve body 6 maintains its closed position shown in FIG. 2, so that there is no possibility that the oil extractor be opened by chance to cause a leak of the lubricating oil in the oil pan. When performing an oil change, the manual handle 26 is slightly raised up against the force of the compression spring 28 to move the handle 26 out of the locking portion 25b of the opening 25 and then the handle is turned about 90° along the guide portion 25a of the opening 25 to keep the valve body 6 at its open position as shown in FIG. 1.

As apparent from the foregoing description, according to the present invention, it is possible for anyone to perform oil change by merely operating the manual handle. Also, the oil extractor of this invention, when not used, can not be opened inadvertently, and further, it can be manufactured at low cost.

What is claimed is:

1. An oil extractor for vehicles or the like comprising an oil pan of a vehicle engine,
    a hollow base block having two open ends, one of said ends constituting an inlet end and formed with a screw thread screwed into said oil pan, and the other of said ends constitutes an outlet end,
    a hollow cylindrical bushing portion having an upper open end and communicating at a lower end thereof with said hollow base block between said inlet end and said outlet end thereof and formed with a shaft hole extending therethrough, said shaft hole includes an uppermost portion adjacent said upper open end having an enlarged diameter, and a narrowed diameter portion communicating with said uppermost portion and said hollow base block and forming an upwardly facing annular shoulder adjacent a juncture of said uppermost portion and said narrowed diameter portion.
    said bushing portion being formed with an L-shaped recess opening therethrough extending substantially 120° and having a rectangular shaped lowermost recess portion at one end of said L-shaped recess disposed substantially coplanar to and at the level of said annular shoulder, said L-shaped recess having an upper edge and a lower edge, said upper edge and said lower edge being slightly spaced from one another at portions of said L-shaped recess remote from said lowermost recess portion,
    a ball-shaped valve body having a central opening therethrough and being rotatably disposed in said hollow base block adjacent said bushing portion and formed with a substantially rectangular slot in an upper peripheral portion thereof,
    a spindle having a cylindrical part slightly smaller in diameter than that of said narrowed diameter portion of said shaft hole and rotatably disposed in said narrowed diameter portion of said bushing portion, said cylindrical part having an upper portion and a bottom, and having a rectangular protuberance formed at said bottom extending into said slot of said valve body, said spindle having a square cross-sectionally shaped stem projecting upwardly from said upper portion thereof, said stem being smaller in width than the diameter of said cylindrical part, said upper portion of said cylindrical part being disposed lower than said annular shoulder of said shaft hole of said bushing portion with said stem projecting above said annular shoulder, an annular seal ring being mounted on a center of said cylindrical part of said spindle and sealingly abutting said narrowed diameter portion of said shaft hole of said bushing portion, said stem has a top thereof disposed at a level between said upper and lower edges of said L-shaped recess remote from said lowermost recess portion, a handle having a disc shaped end portion, the latter having a diameter substantially equal to but slightly smaller than that of said uppermost portion of said shaft hole and formed with a square opening complementary to said stem, the latter extending therethrough with said disc shaped end portion axially moveable relative thereto, said handle including a substantially flat neck portion substantially coplanar with said disc shaped end portion and passing through said L-shaped recess, and a handle grip extending from said neck portion and bent upwardly relative thereto, said neck portion having a thickness substantially the same as but slightly smaller than the spacing of said upper edge of said L-shaped recess from said lower edge at the portions thereof remote from said lowermost recess portion of said L-shaped recess, said neck portion having a rectangular cross-section substantially complementary to that of said rectangular shaped lowermost recess portion of said L-shaped recess, said uppermost portion of said shaft hole is formed with an annular recess, a disc being disposed in said annular recess, and a C-shaped stop ring disposed in said annular recess adjacent and above said disc, a cylindrical columnar insert disposed abuttingly between said disc and the top of said stem of said spindle maintaining a constant engagement of said protuberance of said spindle in said slot of said valve body, a compression spring disposed around said columnar insert and abutting said disc at one end and pressing on said disc shaped end portion of said handle at the other end in a circular engagement thereagainst, a retainer disposed in said hollow base body adjacent said outlet end and formed with a central opening therethrough and with a stepped annular surface facing one side of said valve body, an annular seal disposed in said stepped annular surface of said retainer sealingly abutting said one side of said valve body, said hollow base block being formed with a stepped sealing surface facing another side of said valve body, another annular seal disposed in said stepped sealing surface sealingly abutting the other side of said valve body, said hollow base block being formed adjacent said retainer with an annular groove, an O-ring disposed in said annular groove pressing against said retainer.

said hollow base block having another annular groove adjacent said outlet end, a C-shaped stopper ring disposed in said another annular groove abutting said retainer, said handle and said valve body being operatively coordinated via said spindle such that said handle is positioned between said upper edge and said lower edge at portions remote from said lowermost recess portion of said L-shaped recess with said disc shaped end portion of said handle adjacent the top of said stem and a bottom of said columnar insert when said valve body is rotated by said handle and said spindle such that said central opening thereof is in communication with said inlet end and outlet end of said hollow base block in an open condition of the extractor, said disc shaped end portion of said handle abuts said annular shoulder of said shaft hole and said neck portion extends through said lowermost recess portion of said L-shaped recess when said central opening of said valve body is rotated by said handle and said spindle so as to be out of communication with said inlet end and said outlet end of said hollow base block in a closed condition of the extractor.

* * * * *